INVENTOR.
HAROLD S. LUND

United States Patent Office 2,912,565
Patented Nov. 10, 1959

2,912,565
AUTOMATIC SAFETY CONTROL FOR AUTOMATIC MACHINERY

Harold S. Lund, Milwaukee, Wis., assignor to A. O. Smith Corporation, Milwaukee, Wis., a corporation of New York Application July 2, 1956, Serial No. 595,324

8 Claims. (Cl. 219—124)

This invention relates to a safety disconnect apparatus for automatic fabricating apparatus.

In the past, automatic fabricating apparatus such as arc welding machines have been under the constant watch of an operator. If the apparatus was not functioning correctly, the operator could stop the apparatus and correct the trouble without, generally, any serious damage having been done.

Recently, the automatic methods and assemblying lines have been developed. In such instances, the individual machines are not under the constant supervision of an operator who stays at the machine and watches its operation but rather a central supervisor group is employed.

Automatic fabricating lines such as a vehicle frame line have one or more work stations with automatic welding apparatus to join certain of the parts. One common form of welding apparatus is of the consumable electrode variety wherein a consumable electrode is continuously driven toward and in spaced relation to the work and burned off by an arc established between the electrode and the work. When the weld is completed, the current and the feed are discontinued.

It has been found that due to imperface timing, inherent in most practical controls, the electrode is sometimes driven in contact with the work at the end of the weld and freezes to the work. Now, when the workpiece attempts to move from the work station, the electrode pulls on the workpiece. If the joint is sufficiently strong, serious damage results to the machine and the frame.

The present invention is directed to apparatus which stops the transfer apparatus before any such damage can be done and while the defect in the apparatus can be corrected.

In accordance with the present invention, an electrical signal is established by the short circuit arising from the contact of tool and work such as the freezing of the electrode to the workpiece and actuates a safety control circuit. The control circuit stops the transfer mechanism in the machine until the electrode is disconnected from the workpiece.

The drawing furnished herewith illustrates the best mode presently contemplated for carrying out the invention.

Figure 1:
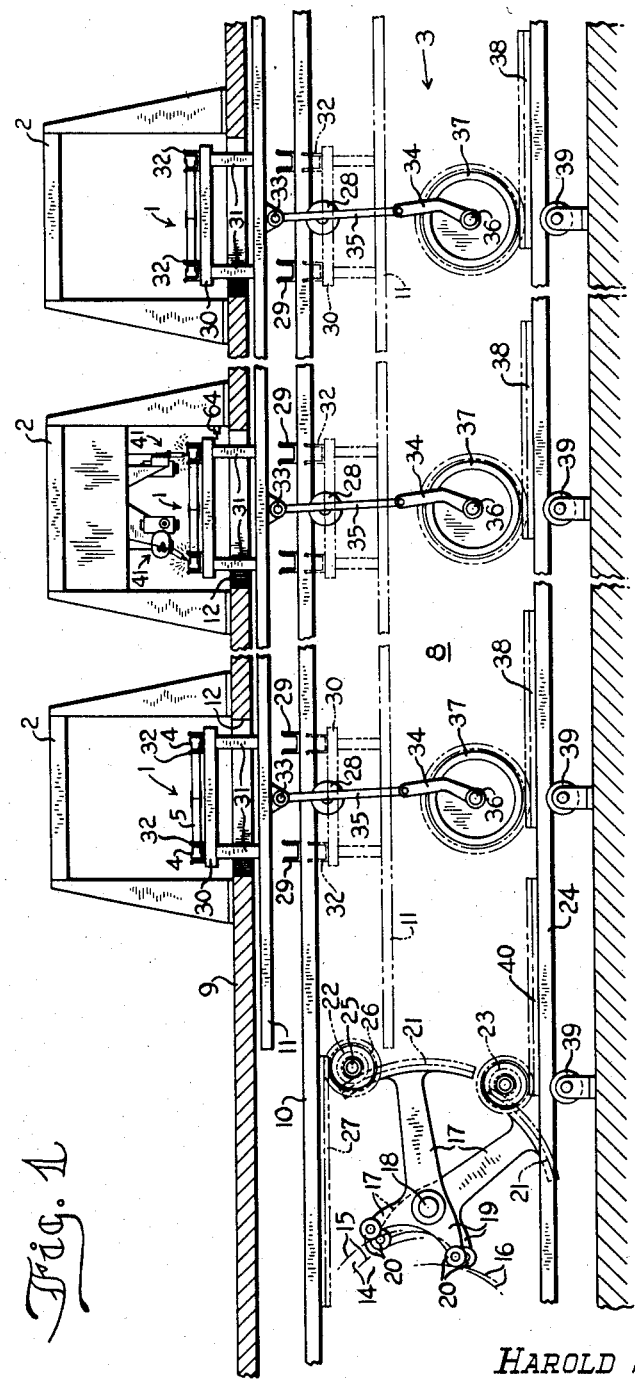
Figure 1 is a schematic view of an automatic assembly line employing an automatic welding machine.
Figure 2:
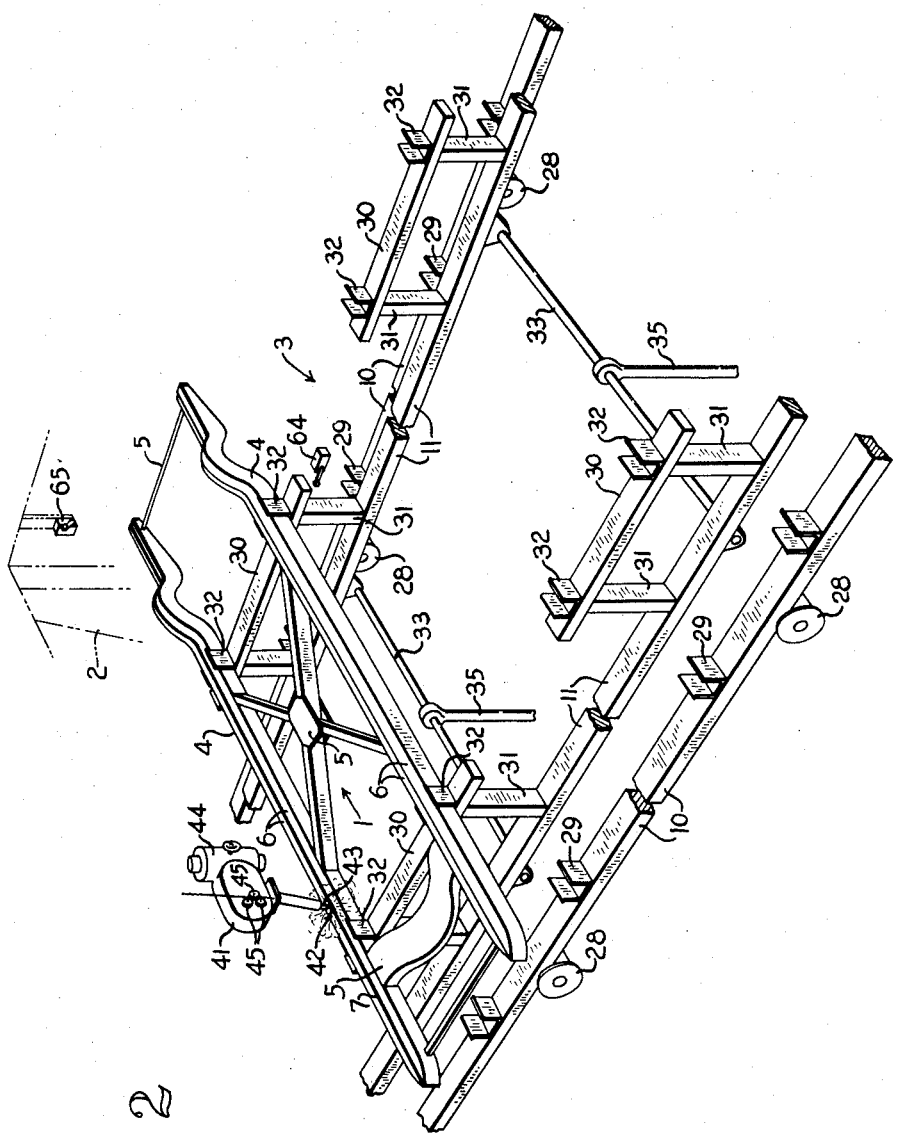
Fig. 2 is a fragmentary perspective view of the assembly line of Figure 1.

Referring to Figures 1 and 2 of the drawings, the illustrated embodiment of the invention comprises an automatic frame line which is adapted to form a vehicle frame 1 and which, in general, comprises three work stations 2 of which the second is shown as an arc welding machine. A transfer line 3 automatically moves the vehicle frame from station to station as the individual operation thereon is completed. The operation of the various work stations and the transfer line is coordinated to provide an automatic, frame-production line.

The frame, as more clearly shown in Fig. 2, comprises a pair of side members 4 joined in spaced relation by various cross-struts and body supports 5.

The side members 4 are formed of a pair of telescoped channel members 6 which are welded as at 7 along the upper longitudinal edge of the outer channel member to form a box-shaped side member. The welding of the side members is by a consumable electrode process as more fully described hereinafter.

Only the second work stations, the arc welding unit, need be shown with some detail for a full and complete understanding of the present invention. Therefore, the first and third work stations are shown in block form and may be any one of a variety of automatic machines, such as, another welding machine, a riveting machine, or a parts assembling machine.

The transfer line mechanism 3 is more fully disclosed in the co-pending application of Donald W. Sherman, entitled, "Method and Apparatus for Automatically Fabricating Vehicle Frames," Serial No. 533,759, filing date September 12, 1955, and assigned to a common assignee with the present application. Reference may be made to this application for a more detailed illustration and explanation than the subsequent description of the transfer line.

Referring to Figure 1, the transfer line mechanism 3 is disposed within a pit 8 beneath a foundation platform 9 which supports the various work stations 2. In general, the transfer line comprises a pair of reciprocating beams 10 adapted to successively transfer the frames from station to station and a pair of lifting members 11 adapted to move the frame upwardly through access openings 12 in the platform 9 and into the adjacent work station.

Figure 3:
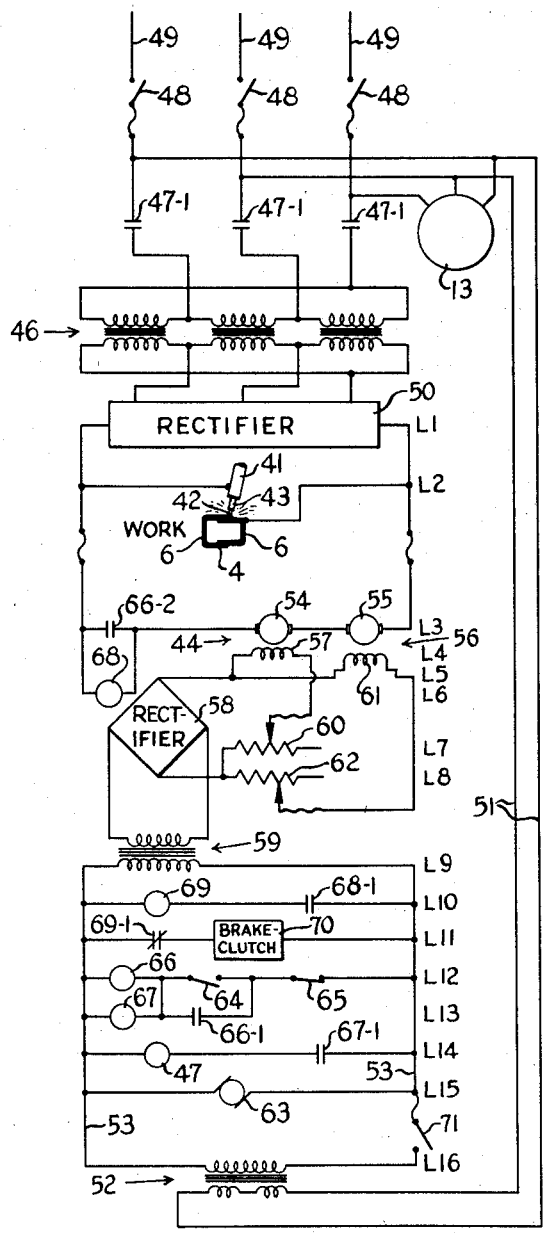
Fig. 3 is a schematic circuit for a safety control applied to the welding machine in accordance with this invention.

The reciprocating beams 10 extend longitudinally within the pit 8 and are simultaneously reciprocated by a drive motor 13, shown only in Fig. 3. The drive motor 13 is coupled by a shaft and speed reducing mechanism, not shown, to drive a pair of cams 14.

Each cam 14 comprises a pair of offset cam surfaces 15 and 16 such that as the cam rotates about the axis of the supporting shaft, not shown, the surfaces 15 and 16 are alternately moving in opposite directions to the right and the left in Figure 1. The cams 14 each drive an associated rocker arm 17 which are pivotally mounted on a shaft 18.

The rocker arms 17 are provided with a U-shaped end forming a pair of generally transversely extending arms 19 carrying cam followers 20 which ride on the cam surfaces 15 and 16. The end arms 19 are axially offset to dispose the cam followers 20 thereon in engagement with the cam surfaces 15 and 16. Therefore, as the cams 14 rotate, the cam surfaces 15 as they move to the right, in Figure 1, exert a corresponding force on the associated cam follower 20 and pivot the rocker arms 17 in a clockwise direction about the shaft. Subsequently, the cam surfaces 15 recede to the left and the cam surfaces 16 advance to the right and exert a corresponding force on the associated followers 20 and pivot the rocker arms 17 in an opposite or counter-clockwise direction. As the cam surfaces 15 and 16 are offset to alternately move to the right, the rocker arms 17 oscillate about the shaft 18 and impart similar oscillatory motion to gear quadrants 21 secured to the opposite end of the rocker arms 17.

The rocker arms 17 are secured to the shaft 18 angularly displaced from each other to dispose the one gear quadrant 21 in operative engagement with a gear 22 adjacent the reciprocating beams 10 and the other gear quadrant 21 in operative engagement with a gear 23 adjacent a lifting actuating beam 24.

The gear 22 is secured to a shaft 25 which extends transversely beneath the beams 10 and which carries a drive gear 26 at each end, in general alignment with the beams 10. The drive gears 25 each mesh with a gear rack 27 which is secured to the undersurface of the adjacent reciprocating beam 10 to impart reciprocating motion to the beams in accordance with the rotation of the cams 14. Thus, as the cams rotate, the rocker arm 17 and attached gear quadrant 21 oscillate about the shaft 18. The driven gear 22 and the shaft 25, then oscillate about the axis of the shaft 25 to drive the gear racks 27 and attached beams 10 back and forth through the gear action with driving gears 26.

By proper selection of the cam surfaces 15 for the cam 14 adapted to drive the gear 22 and therefore beams 10, the transfer beams 10 are provided with a cycle which consists of a period of comparatively rapid forward movement to position the frames 1 at the next succeeding station in the assembly line, a period of dwell during which there is no movement of the transfer beams 10 and during which the lifter units or members 11 act to elevate the frames from the transfer beams 10 to the associated work station 2, a period of comparatively slow return movement during which the transfer beams are returned to their original position, and a second period of dwell during which the transfer beams are stationary and the lifter members 11 lower the frames back onto the transfer beams.

The beams 10 are supported for longitudinal movement by a plurality of spaced rollers 28. To hold the frame 1 on the beams 10 during the transfer operation, channel-shaped brackets 29 are secured to the upper surface of the transfer beams 10 in suitably spaced relation to receive the side members 4 of the frame 1.

When the beams 10 reach their forwardmost movement, the lifting members 11 are automatically actuated in any suitable manner to lift the frame 1 from the beams 10 and move it into the adjacent work station.

The lifting members 11 are a pair of spaced beams having a plurality of frame support bars 30 disposed in longitudinal alignment with the beams and maintained in vertically spaced relation by legs 31. The support bars 30 are longitudinally spaced from each other to dispose channel-shaped frame holders 32, which are secured to their upper surfaces, in alignment with the channel-shaped frame holders 29 on the transfer beams 10 when the latter is at its foremost or rearmost position. Each bar is somewhat longer than the width of a frame, but narrower than the access openings 12 to permit movement of the bars through the access openings.

The lifting members 11, in non-operative position, are disposed with the support bars 30 and the attached brackets 32 below the horizontal plane of the transfer beams 10 to allow the movement of the frames 1 from one work station to the next as shown by the dotted line of the lifting members in Figure 1.

To move the lifting members 11 in a vertical direction, a series of spaced cross rods or shafts 33 join the spaced beams 11. The cross rods 33 are connected to a crank arm 34 by an extension rod 35 which is journaled at one end to the cross rod and at the opposite end to the crank arm.

The crank arms 34 are each secured to a separate rotatable shaft 36 which has a gear 37 secured thereto. The reciprocating beam 24 is disposed adjacent the gears 37 and has secured to its upper surface a series of spaced gear racks 38 mating with gears 37. Therefore, as the beam 24 reciprocates back and forth, the gears 37 and the crank arms 34 oscillate about the axis of the supporting shafts 36. As the crank arms 34 oscillate, the frames 1 are raised into and lowered from the adjacent work stations 2.

The beam 24 is moveably supported on a series of spaced rollers 39 and moved back and forth by the previously noted driven gear 23 which engages a gear rack 40 attached to the upper surface of the beam 24. The gear 23 is driven by the oscillatory motion of the adjacent rocker arm 17 and the attached gear quadrant 21.

By proper selection of the cam surfaces 16 of cam 14 which drives the rocker arm 17 associated with beam 24, the lifting mechanism 11 is coordinated with the movement of the transfer beams 10 as well as the welding machine which is more fully described hereinafter. The cam surfaces 16 are so formed that the lifting mechanism is stationary during the forward movement of the transfer beams 10, raises to lift the frame 1 into the adjacent work station 2 as the beams 10 reach a forward position, dwells during the longest operation within the work stations 2, and then lowers the frame 1 onto the transfer beams 10 which have, during the work operations, moved back to starting position. The transfer beams 10 then move the frames 1 to the subsequent work stations 2 and the lifting and operating cycle are again completed.

In general, the illustrated welding machine comprises a pair of welding heads 41 disposed one adjacent each side member 4 and adapted to move longitudinally along the frame and thereby effect a seam weld by an arc 42 struck between the side members 4 and a consumable electrode 43 which is driven through the head. The welding head 41 is moved longitudinally through any suitable mechanism, not shown, such as by a motor driving a gear which is attached to the welding head and which rides on a rack to move the weld head and consequently the electrode in a path corresponding to the shape of the side members. The electrode 43 is driven toward the work by a rod feed motor 44 which is connected to drive suitable drive rolls 45 and welding voltage is supplied across the electrode 43 and the side members 4 as more fully described hereinafter.

For further mechanical details, other than the rod feed mechanism to be hereinafter described, reference is made to the copending application of Julius B. Tiedemann entitled, "Method and Apparatus for Welding Vehicle Frames," Serial No. 509,782, filed May 20, 1955, and assigned with the present invention to a common assignee and disclosing in detail a complete welding unit similar to that illustrated.

Referring to Fig. 3, a simplified electrical diagram of the welding circuit includes a three-phase welding transformer 46 connected to a three-phase power source, not shown, by serially connected contactors 47–1, controlled by a relay 47 as hereinafter described, and manual control switches 48 in the power lines 49. The output of the transformer 46 is connected to a full wave rectifier 50, in line L–1, which has its output serially connected with the electrode 43 and the work or side members 4 in line L–2 to establish the welding arc 42 when the contactors 47–1 and switches 48 are closed.

The contactors 47–1 are opened and closed, in response to the condition of a control circuit having the control voltage for the various control relays taken from one phase of the three-phase lines 49 by lines 51 and stepped down by a conventional transformer 52 in line L–16 to provide the control power lines 53.

The control circuit controls the operation of the rod feed motor 44 having its armature 54 serially connected in a line L–3 across the arc 42 in a line L–2 with the armature 55 of a bias generator 56 and a set of normally open contacts 66–2 to provide an arc responsive rod feed. The rod feed motor 44 is actuated to drive the electrode 43 through the previously noted drive rollers 45 toward the work by suitable energization of a field winding 57 in line L–4 and the current supplied to its armature 54 from the rectifier 50. The field winding 57 is connected to the output of a control rectifier 58 having its input connected to control power lines through a transformer 59 in line L–9. The motor field winding 57 is connected across the rectifier 58 through a variable resistor 60 in line L-7 to limit the motor field current and prevent over heating of the winding.

The bias generator 56 is also actuated by a field winding 61 in line L-5 which is connected to the output of the rectifier 58 and generates a current which normally tends to drive the motor in an opposite direction from that of the output of the rectifier 50, i.e., withdrawing the electrode 43 from the work. The field winding 61 is also connected across the rectifier 50 through a variable resistor 62 in line L-8 to vary the bias output of the generator and control the rate of electrode feed.

The generator is continuously driven by a drive motor 63 in line L-15 which is mechnaically connected to the generator armature 55 by any suitable mechanism not shown. The rod feed motor 44, under the action of its field 57 and the rectifier output which is proportional to the arc voltage tends to drive the electrode 43 toward the side members. The bias generator 56 tends to energize the motor 44 such as to withdraw the electrode 43 from the side members. Thus, the electrode is variously driven toward the work in accordance with any change in the arc voltage to maintain a constant arc in the conventional manner.

The stopping and starting of the welding cycle is controlled by a normally open limit switch 64 in line L-12 and a normally closed limit switch 65 in line L-12.

The normally open switch 64 is attached to the welding machine 2 in the path of incoming frame 1 as shown in Figs. 1 and 2 and is momentarily closed as the frame moves into the welding machine. When the switch 64 closes, it completes the circuit for the parallel connected relays 66 and 67 in respective lines L-12 and L-13 through switches 64 and 65.

The control relay 66 actuates a set of normally open contacts 66-1 in line L-13, which are in parallel with the limit switch 64 and which lock the control relays 66 and 67 in a completed circuit.

The control relay 66 also pulls in the contacts 66-2 in line L-3 to complete the circuit through the generator armature 55 and the motor armature 54. The rod feed motor 44 is therefore energized when current is received from the rectifier 50 and operates to feed the electrode 43 toward the side members 4 at a generally sufficient speed to allow for consumption of the electrode by the arc 42.

The other control relay 67 closes a set of contacts 67-1 in line L-14. The contacts 67-1 are in series with a contactor coil 47 which when energized by the closing of the contacts, pulls in the main contacts 47-1 in the lines 49 and connects the rectifier 50 to the three-phase lines 49 through the transformer 46.

When contactors 47-1 are closed, the electrode 43 is driven toward the side members and the arc 42 established therebetween.

Simultaneously with the establishment of the arc 42, motor drive for the weld head as previously noted is energized and the welding heads 41 move along a path generally in the contour of the side members 4 to lay down the weld 7.

When the welding heads 41 come to the end of the side members 4 and the welding operation is completed, it strikes the normally closed switch 65. This breaks the energization circuit to the relays 66 and 67.

When relay 66 is de-energized, the locking contacts 66-1 in line L-13 open and relays 66 and 67 cannot be energized until the limit switch 64 is again closed.

When relay 66 is de-energized, the contacts 66-2 in line L-3 for the electrode feed motor circuit also open and disconnect the rod feed motor 44 to stop further feeding of electrode 43.

When relay 67 is de-energized, the contacts 67-1 open after a predetermined period, normally a couple of seconds, and disconnects the contactor 47 in line L-14 from the control power lines. Consequently, the contacts 47-1 in lines 49 open and disconnect the rectifier 50 from the power lines 49. The time delay is provided to allow the electrode wire to burn back after the electrode feed has stopped.

Normally, the electrode 43 is now in slightly spaced relation to the welded frame 1 which is removed from the welding machine and moved to the subsequent work area by the transfer line mechanism as previously described.

It has been found that at times the electrode 43 is not in spaced relation to the frame as just described. At times the electrode 43 freezes or is welded to the frame because of error or breakdown in timing the stopping of welding and electrode feed as well as a breakdown in the unit. And, the electrode may be fed into a crack or opening at the end of work and be wedged or locked to the frame. If the transfer mechanism were to attempt to remove the frame at this time, serious damage to the equipment would result. This is particularly true because the actual production apparatus is much more complicated and involved than the illustrated apparatus as can be readily seen from the previously referred to applications showing a more complete transfer line and welding machine.

If the electrode 43 freezes or short circuits to the side members 4 in the illustrated apparatus, a power circuit is completed to a safety relay 68 in line L-6 which is connected in parallel with the rod feed control contacts 66-2 in line L-3. The output from the bias generator 56 which is still being driven by the motor 63 in line L-15 energizes the relay 68 through the following circuit: from the generator 56 through the motor armature 54 in line L-3, through the relay 68 in line L-6 and then through the shorted electrode 43 and side members 4 to the generator 56.

The relay 68 is normally maintained de-energized and therefore inoperative by the starting contacts 66-2 which short out the relay. The contacts 66-2 open at the end of the welding cycle, as previously described.

When relay 68 is energized, it pulls in its associated contacts 68-1 in line L-10 which are connected in series with a power coil 69 in line L-10 across the control power lines. The power coil 69 opens a set of normally closed contacts 69-1 in line L-11 which serially includes an electromagnetic brake and clutch 70. The brake and clutch 70 control the connection of the motor 13 to the transfer line cams 14 and when the contacts 68-1 open the clutch and brake are actuated to stop further action of the transfer line and thereby prevent damage to the frame and the machinery. A manually operated switch 71 is connected in the control power lines 53 to allow disconnection of the control apparatus.

Although particularly described with respect to a welding operation, the safety device may be employed in any machine wherein the operating tool and the workpiece are to disengage prior to the removal of the work from the machine and wherein the tool and at least the final portion of the work are electrically conductive to allow establishment of an electrical control signal.

The present invention provides a reliable safety apparatus for automatic machines and particularly in an automatic assembly and fabrication line. The safety apparatus in stopping the operation before there is destruction or great damage of the article in process and/or the production equipment permits much closer timing within the machine operation. This, of course, results in faster fabrication of the article being made.

Various modes of carrying out the invention are contemplated as being within the scope of the following claims particularly pointing out and distinctly claiming the subject matter which is regarded as the invention.

I claim:

1. A control for a fabrication line having automatic transfer means to move a workpiece to and from an arc welding machine wherein an arc is established between the workpiece and an electrode, which comprises means to normally maintain the electrode in spaced relation to the workpiece, disconnect means to stop the arc welding machine, control means responsive to a short circuit of the electrode to the work to stop operation of the transfer line when the electrode engages the work, and means responsive to operation of the welding machine to hold said control means inoperative and to release said control means in response to actuation of said disconnect means.

2. An automatic fabrication line having automatic transfer line control means for successively and progressively moving a plurality of workpieces through a transfer line constituting a plurality of work stations at least one of which is a consumable electrode arc welding machine having a predetermined cycle of operation, which comprises means to apply a control voltage across the electrode and the work at the end of the welding cycle, electroresponsive means connected in circuit with the work and the electrode and actuated by said control voltage in response to a short circuit condition between the electrode and the work, and means to connect the electroresponsive means to the transfer line control means to stop the transfer line when a short circuit occurs.

3. In an automatic fabrication line having a transfer mechanism adapted to progressively move a series of workpieces through a series of work stations at least one of which includes a consumable electrode arc welding machine having a predetermined cycle of operation, an electrode feed motor, a bias generator biasing the feed motor in a predetermined direction, an electromagnetic means adapted to stop the transfer mechanism, a circuit serially including the output of the bias generator and the electromagnetic means with the electrode and the work to energize the electromagnetic means when the electrode touches the work, and means to prevent energization of said electromagnetic means during a normal welding cycle and responsive to completion of a normal welding cycle to allow energization of said electromagnetic means.

4. In an automatic fabrication line having a transfer mechanism adapted to progressively move a series of workpieces through a series of work stations at least one of which includes a consumable electrode arc welding machine, an electrode feed motor connected in series circuit with the electrode and the work to vary the electrode drive in accordance with variations in the arc voltage, a bias generator connected in said series circuit with its output voltage opposed to the arc voltage, control means in said series circuit to make and break the circuit, electromagnetic means connected in parallel circuit with the control means and energized by the output of said bias generator when said control means is in a break position and said electrode engages the work.

5. A safety device for an automatic fabrication line having an automatic electroresponsive transfer mechanism for progressively moving an article through a plurality of work stations at least one of which is an automatic consumable electrode arc welder, said arc welder having a rod feed motor controlled by the difference between the arc voltage and the output of a bias generator, which comprises electromagnetic means connected in series with the output of the bias generator, means connecting the electroresponsive means to the transfer mechanism and being adapted to stop the transfer mechanism, means to maintain a short circuit about said electromagnetic means for a predetermined normal period of welding operation, and means to open said short circuit incident to the termination of the welding operation.

6. A safety device for an automatic fabrication line having an automatic transfer mechanism for progressively moving an article through a plurality of work stations at least one of which is an automatic consumable electrode arc welder, said arc welder having a rod feed motor controlled by the difference between the arc voltage and the output of a bias generator, which comprises electromagnetic means connected in series with the output of the bias generator and adapted to stop the transfer mechanism, a set of normally open contacts in the rod feed control circuit connected in shunt with said electromagnetic means, and means to close said contacts during the welding operation and to open the contacts at the end of the welding operation to short circuit said electromagnetic means during the welding operation.

7. A safety control for an automatic mechanism for performing an operation on a workpiece, which comprises a tool, means to relatively move the workpiece and the tool to effect an operation on the workpiece, means responsive to the completion of said operation to automatically separate the tool and the workpiece, an electric power source serially connected in circuit with said tool and said workpiece to provide a signal current if the last named means does not effect the separation of the tool and the workpiece, and means responsive to said signal current to stop the automatic mechanism.

8. A safety control for an automatic fabrication line having a series of machines to successively perform operation on a workpiece and having an automatic transfer mechanism adapted to move the workpiece into and from the machines, at least one of said machines having an operating tool engaging the workpiece at the end of an operating cycle of the machine and being automatically separated therefrom at the end of the cycle and prior to the removal of the workpiece, which comprises an electrical signal generator connected to the workpiece and said tool to provide an electrical signal if said workpiece and said tool do not separate, means to operatively disconnect said generator during a cycle of the machine, and means responsive to said electrical signal to shut off said automatic transfer mechanism.

References Cited in the file of this patent

UNITED STATES PATENTS

| | | |
|---|---|---|
| 1,508,710 | Noble | Sept. 16, 1924 |
| 2,031,288 | Tripp | Feb. 18, 1936 |
| 2,177,104 | Gonser | Oct. 24, 1939 |
| 2,596,951 | Carpenter et al. | May 13, 1952 |
| 2,711,466 | Marx | June 21, 1955 |
| 2,752,469 | Price | June 26, 1956 |